(12) United States Patent
Ferreira et al.

(10) Patent No.: US 11,249,835 B2
(45) Date of Patent: *Feb. 15, 2022

(54) AUTOMATIC REPAIR OF COMPUTING DEVICES IN A DATA CENTER

(71) Applicant: CORE SCIENTIFIC, INC., Bellevue, WA (US)

(72) Inventors: Ian Ferreira, Issaquah, WA (US); Ganesh Balakrishnan, Sammamish, WA (US); Evan Adams, Bainbridge Island, WA (US); Carla Cortez, Playa Del Rey, CA (US); Eric Hullander, Edmonds, WA (US)

(73) Assignee: Core Scientific, Inc., Bellevue, WA (US)

(*) Notice: Subject to any disclaimer, the term of this patent is extended or adjusted under 35 U.S.C. 154(b) by 2 days.

This patent is subject to a terminal disclaimer.

(21) Appl. No.: 16/879,157

(22) Filed: May 20, 2020

(65) Prior Publication Data

US 2021/0026729 A1 Jan. 28, 2021

Related U.S. Application Data

(63) Continuation of application No. 16/776,213, filed on Jan. 29, 2020, now Pat. No. 10,691,528.
(Continued)

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01)

(58) Field of Classification Search
CPC .......................... G06F 11/0793; G06F 11/0721
See application file for complete search history.

(56) References Cited

U.S. PATENT DOCUMENTS 7,017,071 B2 3/2006 Katayama et al.
7,302,608 B1 * 11/2007 Acharya ............ G06F 11/2023
714/13
(Continued)

OTHER PUBLICATIONS

Rajagopalan et at. "App-bisect: autonomous healing for microservice-based apps." In: 7th (USENIX} Workshop on Hot Topics in Cloud Computing (HotCloud 15). Jul. 7, 2015 (Jul. 7, 2015) Retrieved on Oct. 28, 2020 (Oct. 28, 2020) from <https:/lwww .usenix.orgfsystem/files/conferencefhotcloud 15/hotcloud 15-rajagopalan. pdf>.
(Continued)

*Primary Examiner* — Loan L. T. Truong
(74) *Attorney, Agent, or Firm* — Fishman Stewart

(57) ABSTRACT

A management device for managing a plurality of computing devices in a data center may comprise a network interface, a first module that periodically sends health status queries to the computing devices via the network interface, a second module configured to receive responses to the health status queries and collect and store health status data for the computing devices, a third module configured to create support tickets, and/or a fourth module configured to (i) create and periodically update a Cox proportional hazards (CPH) model based on the health status data; (ii) apply a deep neural network (DNN) to the input of the CPH model; (iii) determine a probability of failure for each computing device; (iv) compare each probability of failure with a threshold; and (v) cause the third module to generate a pre-failure support ticket for each computing device having determined probabilities of failure above the threshold.

20 Claims, 7 Drawing Sheets

Related U.S. Application Data

(60) Provisional application No. 62/877,714, filed on Jul. 23, 2019.

(56) References Cited

U.S. PATENT DOCUMENTS

| | | | |
|---|---|---|---|
| 8,024,153 B2* | 9/2011 | Brink, Jr. | G06Q 10/00 |
| | | | 702/182 |
| 8,274,904 B1* | 9/2012 | Lu | H04L 1/22 |
| | | | 370/252 |
| 8,437,452 B2 | 5/2013 | Beattie, Jr. et al. | |
| 9,098,278 B1 | 8/2015 | Nay | |
| 9,146,791 B2* | 9/2015 | Sorenson | G06F 11/0757 |
| 9,363,192 B2* | 6/2016 | Padala | G06F 9/5077 |
| 9,734,448 B2* | 8/2017 | Bolich | G06N 5/02 |
| 9,817,709 B2* | 11/2017 | Gowin | G06F 11/0793 |
| 10,073,749 B2* | 9/2018 | Ferranti | G05B 23/0208 |
| 10,163,061 B2* | 12/2018 | Grove | G06N 20/00 |
| 10,270,644 B1 | 4/2019 | Valsecchi et al. | |
| 10,425,156 B1 | 9/2019 | Zeng et al. | |
| 10,445,643 B2 | 10/2019 | Katz et al. | |
| 10,470,341 B2 | 11/2019 | Matsumura et al. | |
| 10,504,179 B1 | 12/2019 | McGuire et al. | |
| 10,521,304 B1 | 12/2019 | Reddy et al. | |
| 10,575,445 B2 | 2/2020 | Matsuyama et al. | |
| 10,609,840 B2 | 3/2020 | Gao et al. | |
| 10,712,733 B2* | 7/2020 | Nikovski | G06N 5/022 |
| 2005/0171923 A1* | 8/2005 | Kiiveri | G16B 40/20 |
| 2007/0288626 A1* | 12/2007 | Cunningham | H04Q 9/00 |
| | | | 709/224 |
| 2008/0004748 A1* | 1/2008 | Butler | G06Q 30/02 |
| | | | 700/244 |
| 2012/0005534 A1 | 1/2012 | Li et al. | |
| 2012/0300663 A1 | 11/2012 | Lu et al. | |
| 2013/0003579 A1 | 1/2013 | Lu et al. | |
| 2013/0162444 A1 | 6/2013 | Boulanger et al. | |
| 2013/0272318 A1 | 10/2013 | Swinkels et al. | |
| 2015/0269043 A1 | 9/2015 | Wilson et al. | |
| 2015/0271008 A1* | 9/2015 | Jain | H04L 41/0686 |
| | | | 714/57 |
| 2017/0093923 A1 | 3/2017 | Duan | |
| 2017/0123889 A1 | 5/2017 | Haridas et al. | |
| 2017/0249203 A1 | 8/2017 | Motwani et al. | |
| 2018/0164794 A1* | 6/2018 | Nikovski | G05B 23/0221 |
| 2018/0314576 A1* | 11/2018 | Pasupuleti | G06F 11/3089 |
| 2019/0122330 A1* | 4/2019 | Saget | A61F 2/4607 |
| 2020/0122859 A1* | 4/2020 | Barclay | G07C 5/008 |

OTHER PUBLICATIONS

International Search Report and Written Opinion for corresponding International Patent Application PCT/US2020/043078 dated Nov. 24, 2020.

Vijayalakshmi Muthuswamy et al., "Automatic Healing Services in Cloud Computing Environment", https://www.researchgate.net/publication/310799832; May 2016.

Hansapani Ridrigo et al. "Artificial Neural Network Model for Predicting Lung Cancer Survival" Journal of Data Analysis and Information Processing, 2017, 5, 33-47.

Instance Groups, https://web.archive.org/web/20190603144517/https://cloud.google.com/computer/, Dec. 11, 2019.

Using Autohealing for Highly Available Apps, https://cloud.google/com/products/compute/, Dec. 11, 2019.

Lecture 5 "The proportional Hazards Regression Model", www.math.ucsd.edu_slash_~rxu_slash_math284_slash_slect5.pdf.

Transcript with selected screenshots of "Firmware for ASIC S9. 20 Th/s." video posted to Youtube on Apr. 16, 2019; <https://www.youtube.com/watch?v=Sp_vg5_3IU4>; accessed Mar. 29, 2021.

Transcript with selected screenshots of "Vnish Smart Mine Antminer S9 Firmware Special Edition, Virus Blocking. Fee 1.7%-1.8%" video posted to Youtube May 21, 2019; <https://www.youtube.com/watch?v=Py9e7n73rtl>; accessed Mar. 29, 2021.

* cited by examiner

AUTOMATIC REPAIR OF COMPUTING DEVICES IN A DATA CENTER

CROSS-REFERENCE TO RELATED APPLICATIONS

This application is a continuation application of U.S. patent application Ser. No. 16/776,213 filed Jan. 29, 2020, which claims priority to U.S. Provisional Patent Application Ser. No. 62/877,714, filed on Jul. 23, 2019, and titled "COMPUTING SYSTEM", the contents of which are hereby incorporated by reference in their entireties.

TECHNICAL FIELD

The present disclosure generally relates to the field of computing and, more particularly, to systems and methods for managing a plurality of computing devices such as miners in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (i.e., practically unmodifiable) by including a hash. The hash is a number that is calculated based on the blocks and that meets the particular blockchain's criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. Depending on the blockchain, they may receive a reward (e.g., a coin reward or transaction fee reward) for being first to calculate a successful hash, and that reward may motivate them to continue participating (mining).

Many blockchain networks require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer. The difficulty level may change periodically for some blockchain networks that attempt to compensate for increases in hash power that occur on the network.

Participants in the network operate standard PCs, servers, or specialized computing devices called mining rigs or miners. Because of the difficulty involved and the amount of computation required, the miners are typically configured with specialized components that improve the speed at which hashes (the device's hash rate) or other calculations required for the blockchain network are performed. Examples of specialized components include application specific integrated circuits (ASICs), field programmable gate arrays (FPGAs), graphics processing units (GPUs) and accelerated processing unit (APUs). Specialized cryptocurrency mining software (e.g., cgminer) may also be used with the specialized components, for example software applications configured to compute the SHA-256 algorithm.

Miners are often run for long periods of time at high frequencies that generate large amounts of heat. Even with cooling (e.g., high speed fans), the heat and constant operation can negatively impact the reliability and longevity of the components in the miners. ASIC miners for example have large numbers of hashing chips (e.g., 100's) that are more likely to fail as temperatures rise.

Many participants in blockchain networks operate large numbers (e.g., 1000's, 10,000's, 50,000's, or more) of different miners (e.g., different generations of miners from one manufacturer or different manufacturers) concurrently in large data centers. These data centers and large numbers of miners can be difficult to manage. Data centers housing large numbers of miners or other ASIC- or GPU-based systems have different challenges than traditional data centers housing more general computers. This is due to the significantly higher density, including higher power usage, higher heat generation, and near constant compute-intensive operation.

The constant operation often leads to performance issues such as memory leaks. A memory leak can reduce the performance of the computer by reducing the amount of available memory. Memory leaks can be a problem when programs run for an extended time and consume more and more memory over time. Eventually too much of the available memory may become allocated, and all or part of the system or device may stop working correctly. One or more applications running on the device may fail and the system may slow down due to thrashing. Thrashing is when a computer's virtual memory resources are overused, leading to a constant state of paging and page faults, dramatically slowing or inhibiting application-level processing.

In large data centers, there can be a significant number of units failing each day, both for known and unknown reasons. A typical data center management solution is to determine when a computing device is no longer responding to requests (e.g., responding to network pings), and then to power cycle the device (e.g., by going to the device and unplugging it). This is less than ideal, as it can take a significant amount of the data center technician's time to fine and manually power cycle all of the failed devices each day. In addition, there can be a significant loss in processing during the time when the device's performance is degraded while the device is still able to respond to requests.

For at least these reasons, there is a desire for a system and method to allow for improved management of large numbers of computing devices such as miners in a data center.

SUMMARY

A method and system for more easily managing a data center with a plurality of computing devices such as miners is contemplated. Example computing devices include, for example, ASIC miners, FPGA miners, and GPU miners, but other computing device types are possible and contemplated.

In one embodiment, the method comprises issuing automatic (e.g., without human intervention) status queries and repair instructions based on the attribute being monitored and predefined healthy attribute levels. A first health status query for a second computing device may be sent. The health status query may include, for example, hash rate or temperature. In response to not receiving an acceptable response to the first health status query within a first predetermined time, a first repair instruction is sent to the second computing device. Once enough time for the first repair instruction to complete has elapsed, a second health status query for the second computing device may be sent. In response to not receiving an acceptable response to the second health status query within a second predetermined time, a second repair instruction is sent to the second computing device. Once enough time for the second repair instruction to complete has elapsed, a third health status query for the second computing device may be dispatched. In response to not receiving an acceptable response to the third health status query within an acceptable time period, a repair ticket may be generated.

In some embodiments, the first repair instructions may include resetting just the mining application executing on the computing device, adjusting fan speed, voltage levels, and operating frequencies, and the second repair instructions may include resetting the entire computing device.

A system for managing computing devices operating in a data center is also contemplated. In one embodiment, the system may comprise a network interface for communicating with the computing devices being managed and a number of modules that together are configured to automatically manage the computing devices. The modules may comprise, for example, a first module that sends status queries for the computing devices being managed. An exemplary second module may be configured to receive and process response to the health status queries, and a third module may be configured to create support tickets in response to two or more failed repair attempts. A repair attempt may be determined to have failed when a predetermined amount of time has passed without receiving an acceptable response to a health status query.

The system may be implemented in software as instructions executable by a processor of a computational device, and the instructions may be stored on a non-transitory, computer-readable storage medium such as a flash memory drive, CD-ROM, DVD-ROM, or hard disk.

In embodiments, a management device for managing a plurality of computing devices in a data center may comprise a network interface for communicating with the plurality of computing devices, a first module that periodically sends health status queries to each of the computing devices via the network interface, a second module configured to receive responses to the health status queries and collect and store health status data for each of the computing devices, a third module configured to create support tickets, and/or a fourth module. The fourth module may be configured to: (i) create and periodically update a Cox proportional hazards (CPH) model based on the collected health status data; (ii) apply a deep neural network (DNN) to the input of the CPH model; (iii) determine a probability of failure for each of the plurality of computing devices; (iv) compare each determined probability of failure with a predetermined threshold; and/or (v) cause the third module to generate a pre-failure support ticket for each of the plurality of computing devices having determined probabilities of failure that exceed the predetermined threshold.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
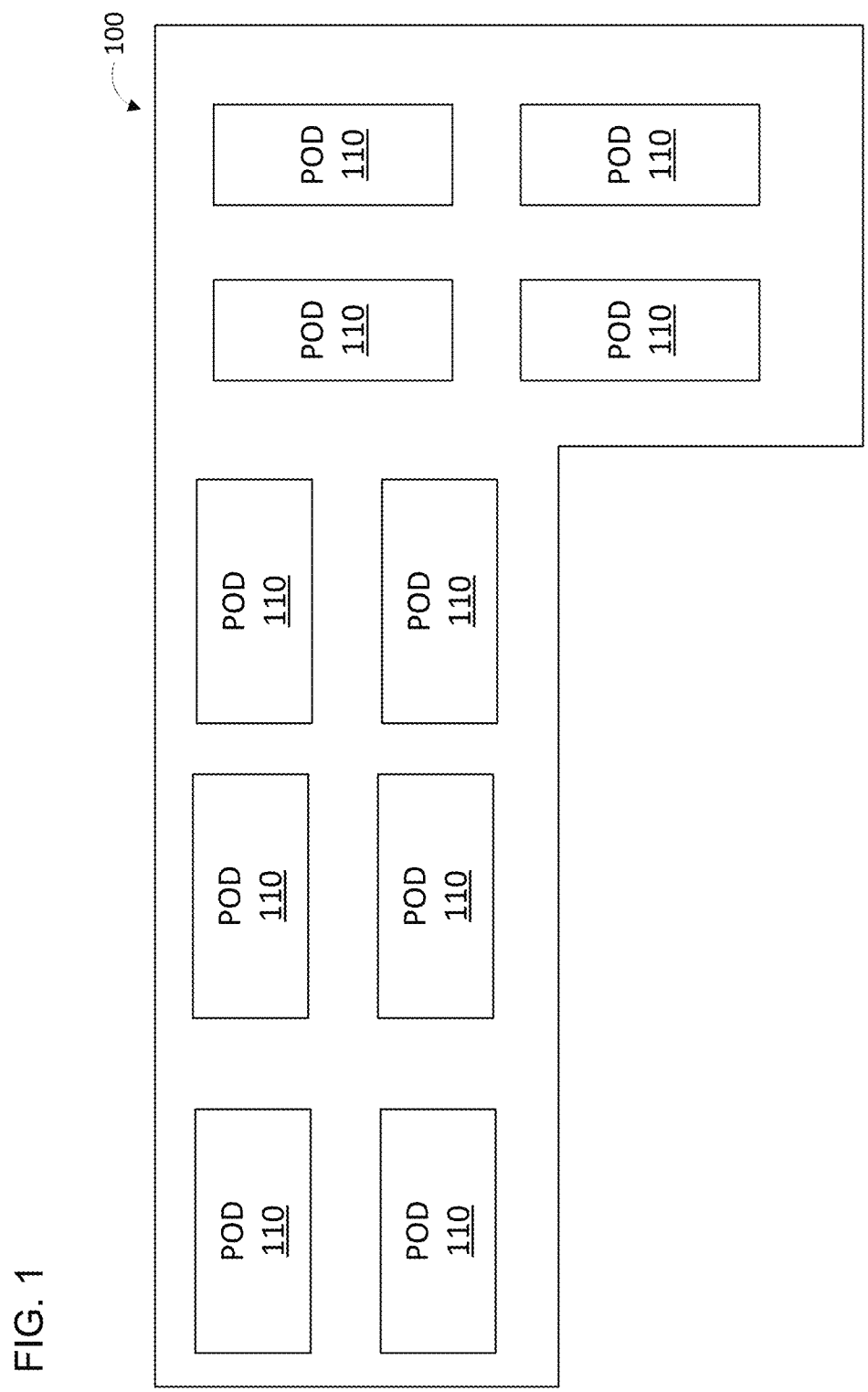
FIG. 1 is a top-down view of one example of a data center for computing devices.

Referring now to FIG. 1, a top-down view of one example of a data center 100 for computing devices is shown. The data center 100 is configured with a large number of pods 110. Pods are standardized blocks of racks, either in a row or (more typically) a pair of rows, that share some common infrastructure elements like power distribution units, network routers/switches, containment systems, and air handlers. For example, a pod may have two parallel racks of devices, spaced apart and each facing outwards. The devices on the racks may all be oriented to pull cool air in from outside the pod and discharge the hot air (heated by the computing devices) into the empty space in the center of the pod where the hot air then rises up and out of the data center. For example, there may be hot air ducts positioned above the middle of each pod to capture the hot waste air and then discharge it out of the data center via vents in the roof of the data center.

Figure 2:
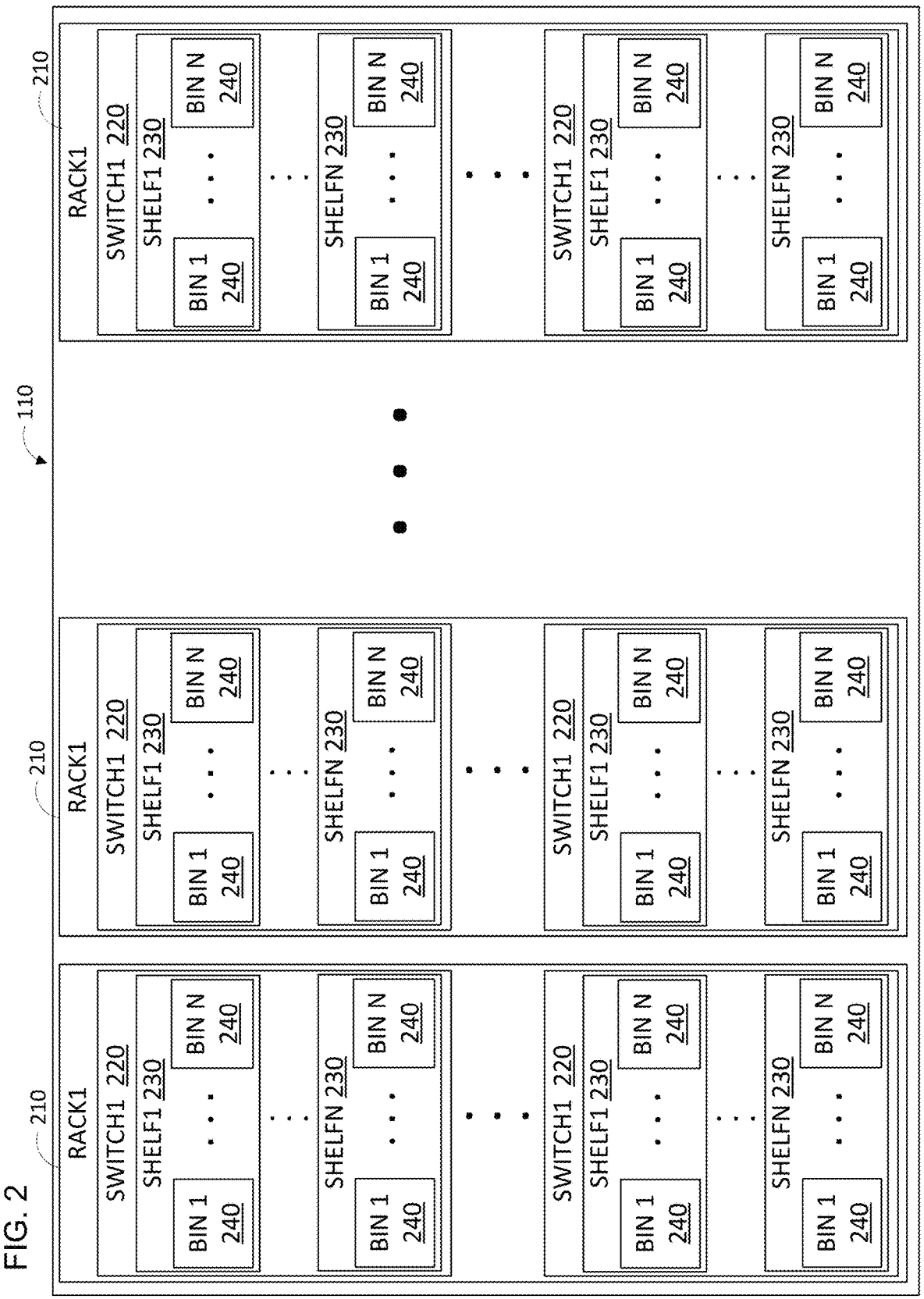
FIG. 2 is a front view of one example of a pod in a data center for computing devices.

Turning now to FIG. 2, the front side of one example of a pod 110 is shown. The pod 110 has several racks 210 that each have a number of shelves 230 for holding computing devices. For organization and management purposes, the shelves may be grouped together in switch sections 220 that are each supported by the same network switch. In each of the shelves 230 there may be multiple bin locations 240 that each hold a single computing device. Each computing device may be installed in a bin with connections for power and a network connection.

Figure 3:
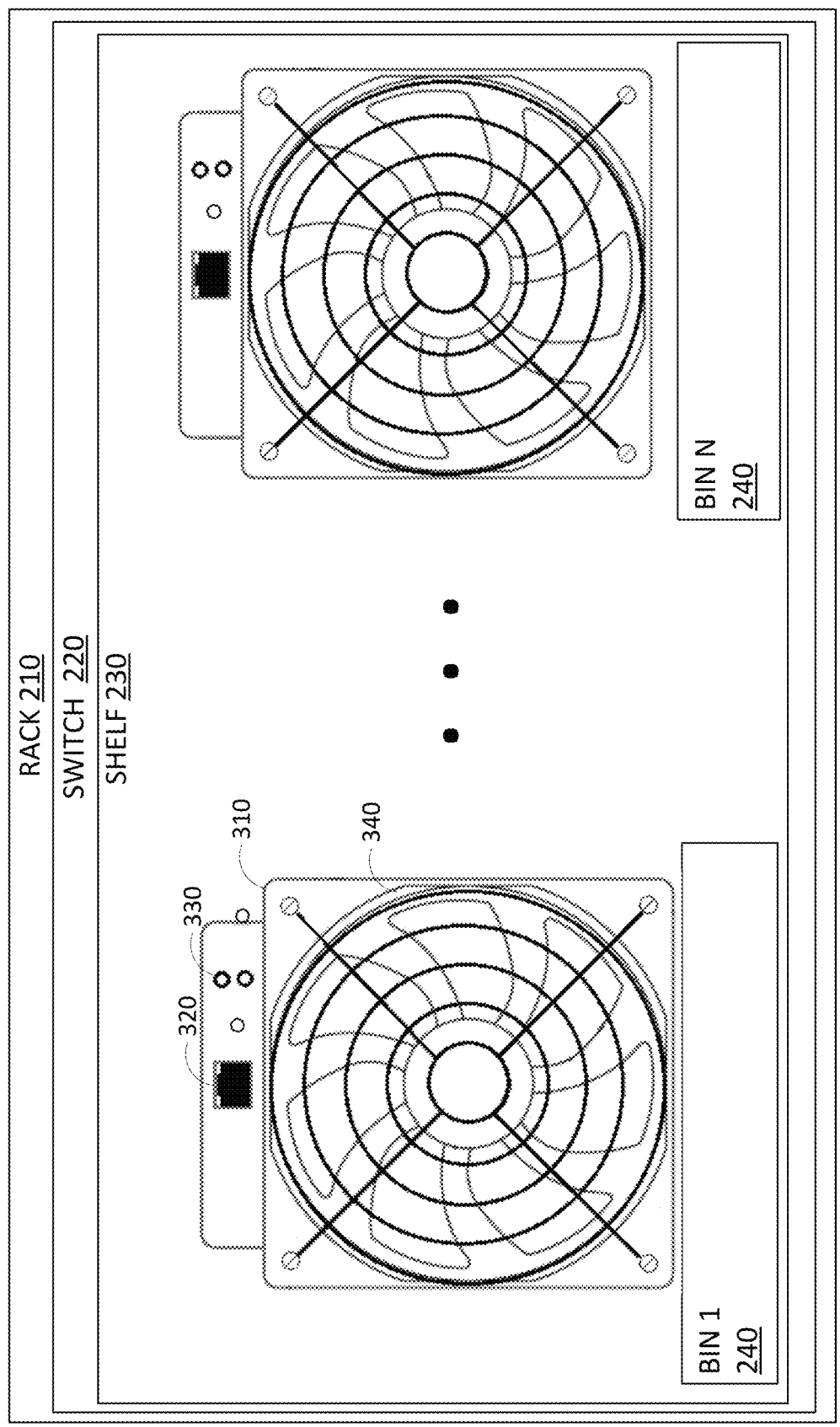
FIG. 3 is an illustration of one example of a portion of a rack for computing devices in a data center.

Turning now to FIG. 3, a more detailed frontal view of one shelf 230 in an example rack 210 is shown. In this example, a computing device 310 is installed in each bin 240 in the shelf 230. In this example, computing device 310 is an ASIC miner. ASIC miners typically include a controller board with a network port 320, one or more status indicator LEDs 330 and a pair of cooling fans (front fan 340 shown) that draw air through the center of the miner where there are multiple hash boards performing calculations and generating heat.

Figure 4:
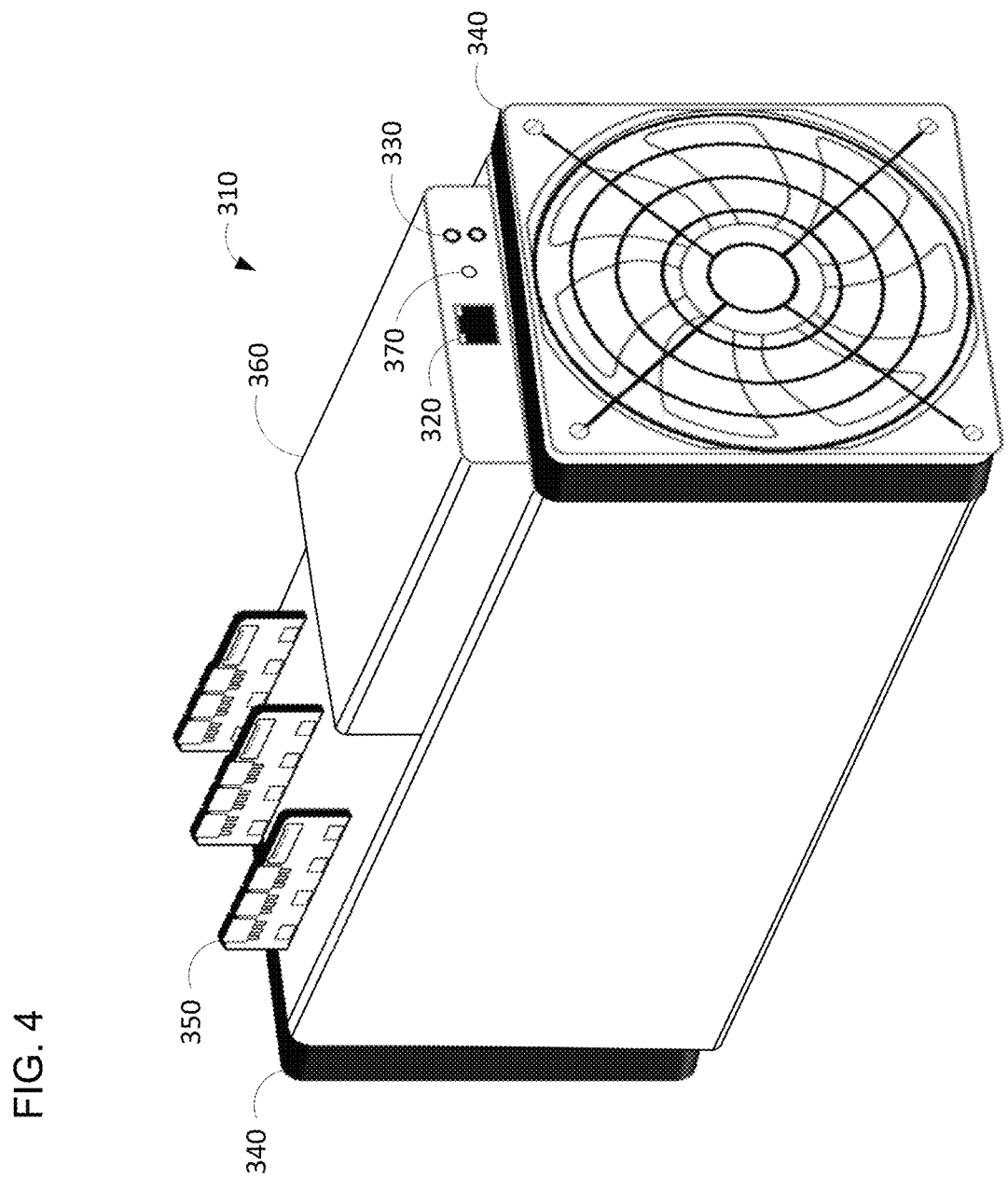
FIG. 4 is an illustration of one example of a computing device, specifically a miner.

Turning now to FIG. 4, an illustration of one example embodiment of computing device 310 is shown. In this example, computing device 310 includes a controller 360 that oversees operation of the multiple hash boards 350 in the device. The controller 360 also includes a network port 320 for communications, a reset button 370 for resetting computing device 310, and one or more indicator LEDs 330. Two fans 340 (one front and one rear) draw cool air into the computing device 310 and expel waste heat through the back of computing device 310. Other types of computing devices are possible and contemplated.

As noted above, one issue facing operators of large data centers is identifying and servicing computing devices that are not operating optimally. Waiting for devices to fail and then manually power cycling or resetting them using reset button 370 is undesirable for several reasons, including the time required and the lost productivity while the device degrades from fully operational to a non-responsive state. For at least this reason, an improved system and method for managing large numbers of computing devices is needed.

Figure 5:
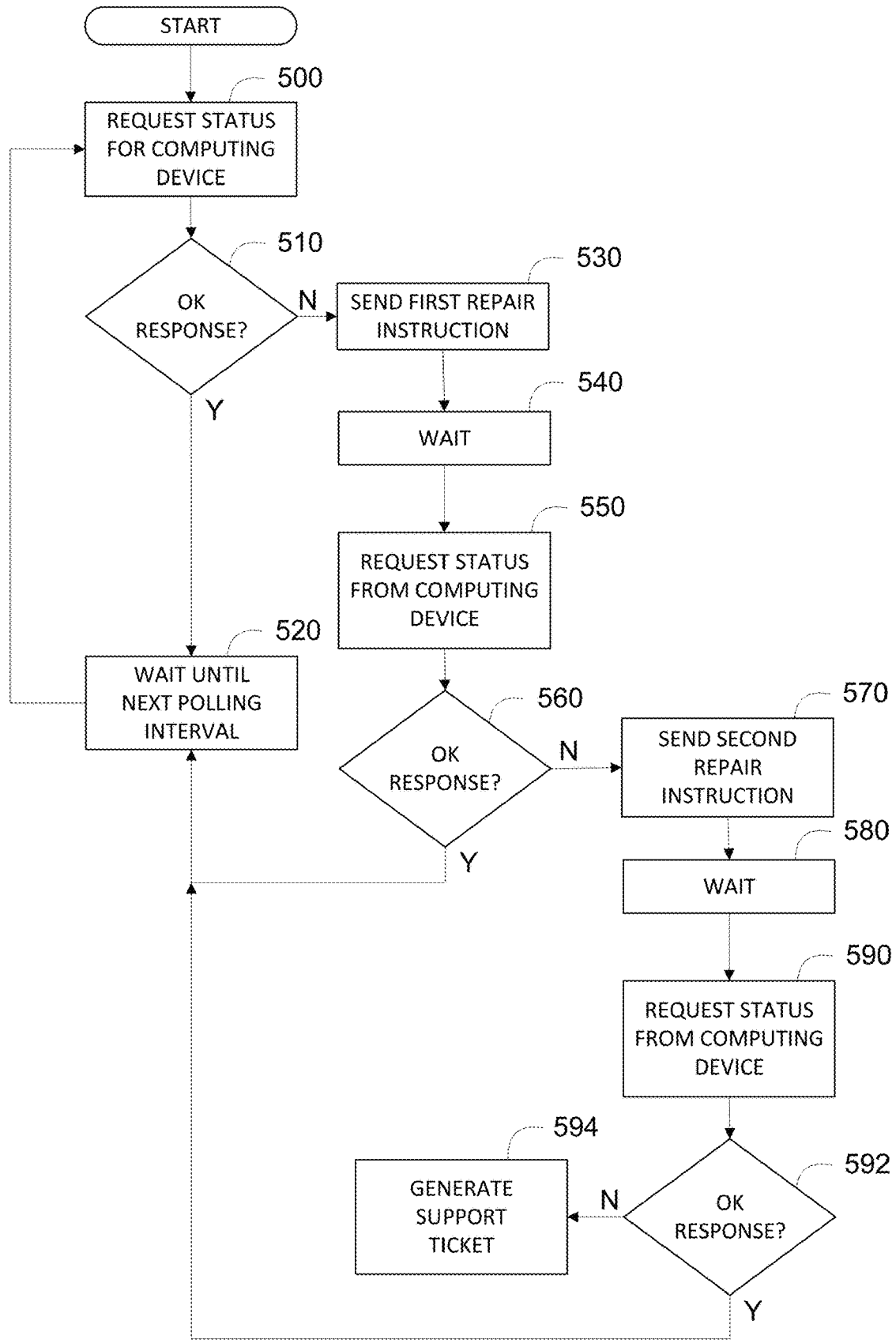
FIG. 5 is a flowchart illustrating one example method of managing computing devices such as miners in a data center according to the teachings of the present disclosure.

Turning now to FIG. 5, a flow chart is shown illustrating an example embodiment of an improved method for managing computing devices in a data center according to the teachings of the present disclosure. Status information from one or more computing devices is requested (step 500). This request may be sent from a management server to one or more computing devices 310 via a network connection (e.g., wired or wireless Ethernet). If the response is acceptable (step 510), another periodic request may be sent after a predetermined polling interval has elapsed (step 520). For example, a status request may be sent out every 1, 5, 6, 10 or 30 minutes. Status requests may request data on different operating parameters for the computing device, such as hash rate, temperature, fan speed, or number of hardware errors. An example request may query a particular computing device 310 for its temperature, and an acceptable response may be one indicating an operating temperature below the manufacturer's specified operating temperature for that particular device type and model.

Some requests may be sent to a data provider rather than to the device being monitored. For example, in some embodiments hash rate requests may be sent to the device being monitored, but in other embodiments the request may be sent to a database storing information from the mining pool that the computing device is currently working on. The database may for example be a local copy of the data provided by the mining pool. Hash rates are typically calculated in terms of hashes per second, e.g., 3 PH/s ($3 \times 10^{15}$ hashes per second), 13 TH/s ($13 \times 10^{12}$ hashes per second) or 90 GH/s ($90 \times 10^9$ hashes per second), and may be periodically provided by mining pools. Some mining pools track hashes for mining devices on a worker basis. This means that if there is more than one mining device connected to the pool as a single worker, hash rate information reported may cover all those mining devices in bulk. Some pools permit the use of a designated worker name for mining devices, which enables the pool to track hash rates and report them for each mining device separately.

If the response does not indicate an acceptable status for the computing device (step 510), a first repair instruction is sent to the computing device (step 530). One example of a first repair instruction is restarting an application that is running on the computing device. For example, a mining application running on a mining device may be restarted. This is distinct from restarting the entire computing device. Another example of a repair instruction includes an instruction to increase the fan speed, or to reduce the operating voltage issued in response to receiving a status response indicative of a temperature that is too high. Depending on the computing device being managed, repair instructions may also include running computer programs on the computing device.

Once the first repair instruction has been sent, a wait time occurs (step 540) to permit the target computing device to complete executing the first repair instruction. For example, a five, ten or fifteen minute wait time may be used to provide sufficient time for the target computing device to complete execution (or repeated execution) of the first repair instruction. Then, another status request is sent to the computing device (step 550). If the response is acceptable (step 560), e.g., within the manufacturer's specifications for temperature or hash rate, the system waits until the next polling period (step 520) before proceeding with another status request (step 500). If the response is not acceptable (step 560), a second repair instruction is sent (step 570). One example of second repair instruction is a full device reset instruction. Another example of a second repair instruction is an instruction to reduce the operating frequency in response to receiving a status response indicative of a temperature that is too high.

Once the second repair instruction has been sent, a wait time occurs (step 580) to permit the target computing device to complete executing the second repair instruction. Then, another status request is sent to the computing device (step 590). If the response is acceptable (step 592), e.g., within the manufacturer's specifications for temperature or hash rate, the system waits until the next polling period (step 520) before proceeding with another status request (step 500). An acceptable response (step 510, 560, 592) may also cause the computing device to be removed from any existing lists of malfunctioning devices. If the response is not acceptable (step 592), a support ticket is generated (step 594). The support ticket may include not only the identify of the computing device, but also the history of the repair instructions performed and resulting health status reports. Beneficially, this may save the support staff time from having to manually perform the repair instructions.

In some embodiments, the health status inquiries may comprise running a diagnostic instruction or set of instructions. In other embodiments the health status inquires may be queries into a database that stores status information periodically collected for the computing devices (e.g., received from the mining pool that the computing devices were working on).

Figure 6:
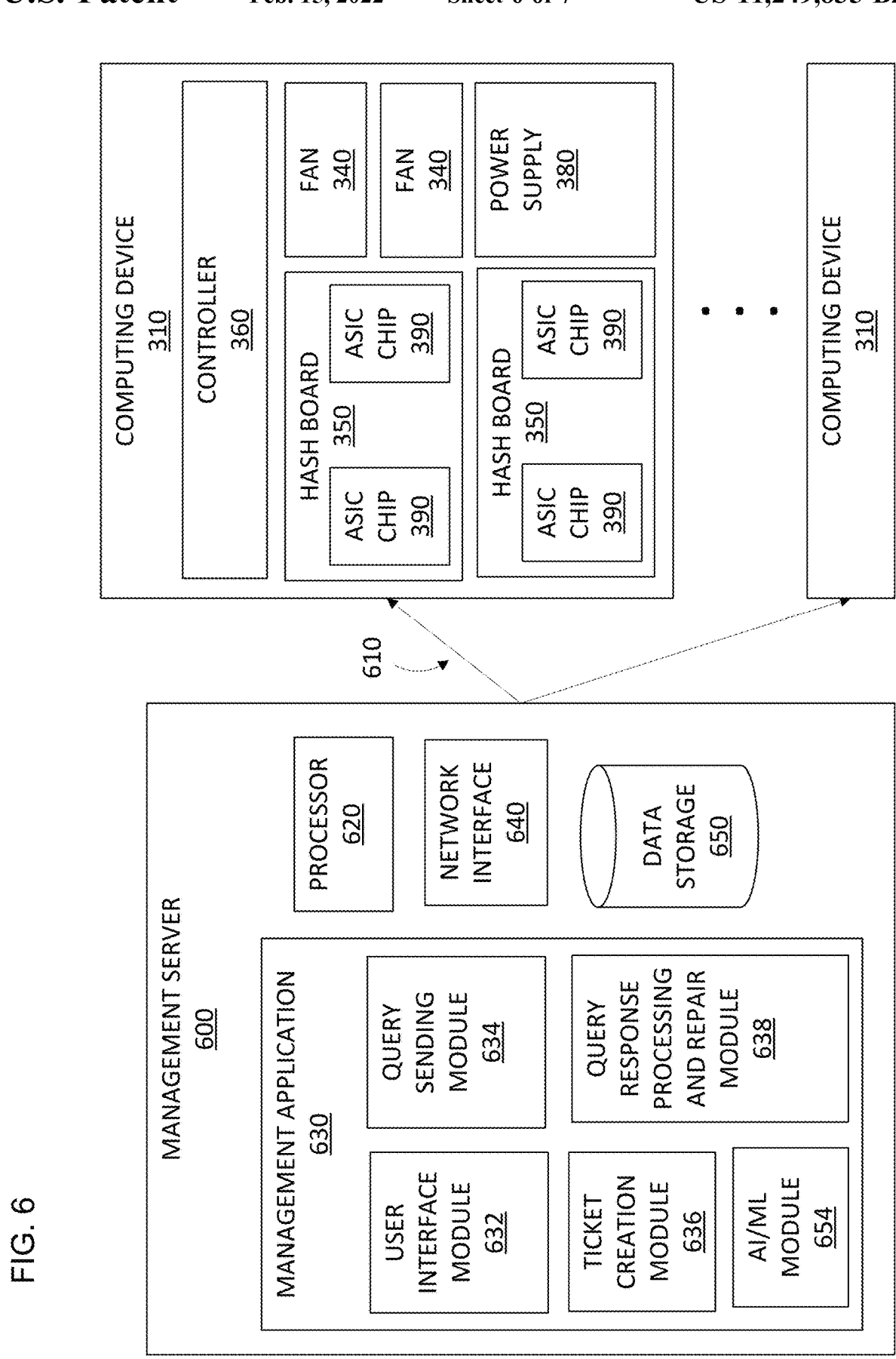
FIG. 6 is an illustration of an example of a system for managing computing devices in a data center according to the teachings of the present disclosure.

Turning now to FIG. 6, an illustration of an example embodiment of a system for managing computing devices in a data center is shown. In this embodiment the system comprises a large number of computing devices 310 (e.g., miners). The computing devices 310 communicate over a network 610 with a management server 600 via the server's network interface 640. While wireless networks are possible, current computing device density in data centers means wired networks such as wired Ethernet are currently preferred for communications between management server 600 and computing devices 310. In some embodiments, computing devices 310 may include a controller 360 and a network interface for communicating with management server 600 via network 610. Controller 360 may be configured to send compute tasks to one or more compute or hash boards 350, each having a number of GPU or ASIC chips 390 that can operate at a frequency specified by the controller. Computing device 310 may further comprise multiple cooling fans 340 and a power supply 380. The voltage output by the power supply to ASIC chips 390 may be varied based on setting configured by controller 360. Higher voltage and frequency levels for ASIC chips 390 will increase performance, but they may also increase heat and negatively impact longevity.

Management server 600 may be a traditional PC or server, or specialized appliance. Management server 600 may be configured with one or more processors 620, volatile memory and non-volatile memory such as flash storage or internal or external hard disk (e.g., network attached storage accessible to server 600). Management server 600 is configured to execute management application 630 to assist users (e.g., data center technicians) with managing computing devices 310. Management server 600 may be located within the same data center or facility as computing devices 310 or located remotely and connected to computing devices 310 via the Internet.

Management application 630 is preferably implemented in software (e.g., instructions stored on a non-volatile storage medium such as a hard disk, flash drive, or DVD-ROM), but hardware implementations are possible. Management application 630 may include a number of modules, including for example, a user interface module 632 that displays data to a user and receives input from a user (e.g., via an external display or via the user's web browser), a query sending module 634 that sends status queries to get status data for computing devices 310 (e.g., periodically polling for each device's health status), a query response processing and repair module 638 that receives and processes status query responses and issues repair instructions when needed, and a support ticket creation module 636 that creates support tickets when the repair instructions fail to move the computing device to an acceptable state. If resolved, module 636 may generate a "resolved" ticket or update existing ticket(s) with details providing a record in ticketing system of computing device's history. Modules 636 and 638 may also include intelligence (e.g., rules) that prevent the management application from getting stuck in a loop due to recurring problems with a device or set of devices. For example, once a support ticket has been sent, ticket creation module 636 may be configured to not send subsequent repair instructions or create additional tickets until the technician indicates that the device has been repaired or the device responds properly to health status inquiries (indicating the device was repaired).

In some embodiments, the user interface module 632 may provide an interface to users to configure rules (or override predefined rules) for when to send repair instructions and which repair instructions to send. The management application 630 may be configured to automatically execute such steps if it determines that the conditions of the rules (e.g., symptoms or leading indicators of problems) are met. In some embodiments, the computing system may be configured to learn based on past data of the activities and/or profiles of the second computing devices and take corrective/proactive actions before a problem occurs, such as based on leading indicators. For example, in some learning-based embodiments management application 630 may be configured to launch repairs before a previously encountered problem (e.g., a device hang) can reoccur based on leading indicators (e.g., a decline in hash rate is detected).

In one embodiment, the management application 630 may be configured to monitor anomalies in key health metrics (e.g., hash rate, temperature), and when a problem is identified, identify the scale of the problem and escalate appropriately, including notifying appropriate individuals when escalation beyond automatically issuing repair instructions (self-healing) is required. For example, if a single device reports an increase in temperature, a first (and second if needed), repair instruction may be dispatched. However, if multiple devices (e.g., greater than 5%) in the same rack begin experiencing increased temperatures, then the management application 630 may be configured to (1) turn on or increase the rate of active cooling for that area of the data center (e.g., evaporative coolers or air conditioners), or (2) create a high priority ticket for the rack, as multiple high temperature health status reports may be indicative of a problem with the broader airflow in that part of the data center rather than just a problem with the individual computing device.

In another embodiment, management application 630 may be configured to apply artificial intelligence (AI) and machine learning (ML) to predict anomalies in the computing devices before they happen or reach critical impact and to create remedial mechanisms (e.g., repair instructions). For example, in one embodiment management application 630 may be configured to track status report history for computing devices 310 in data storage 650. When a pattern of problems are detected (e.g., a series of multiple unacceptable health status responses within a predetermined time period), ticket creation module 636 may create a ticket even if the repair instructions are successful. These "repeat offender" devices may be on the verge of a more catastrophic failure and may benefit from a technician inspecting and replacing wear components like the fans or power supplies. Management application 630 may be further configured to provide users with a list of repeat offender devices via user interface module 632.

In some embodiments, management application 630 may be configured to avoid having multiple tickets generated when multiple machines go down with the same problem in the same area. Areas may be defined by aggregation. The levels may increase the number of second computing devices affected in the defined area from the individual second computing device up to, and including, second computing devices at a plurality of datacenters. For example, defined levels may include: overall (all sites), site, pod, rack, switch, and the individual computing device. For example, if the "machines up" metric is healthy at a site level, pod level and rack level, but unhealthy at a switch level, one ticket may be generated at the switch level. If management application 630 detects health status numbers outside of an acceptable range for a particular level of aggregation, the application may generate a ticket as well as dispatch repair instructions in an attempt to auto-resolve the problem. A ticket per customer may be generated when multiple computing devices go down because of the same problem, for example, in the case of a dead switch cutting network communication with the computing devices of multiple companies.

In some embodiments, to help identify when a computing device 310 might enter a failed state and what other indicators may be correlated with a failed state, management application 630 may include an artificial intelligence (AI) and machine learning (ML) module 654 to predict anomalies in computing devices 310 and to create remedial mechanisms (e.g., support tickets) before they happen or reach critical impact. In some embodiments, AI/ML module 654 may be configured to use a Cox proportional hazards (CPH) model to predict the likelihood of a failure event for computing devices 310 as a function of historical telemetry data (stored in data storage 650) and optionally climatic data as well (e.g., temperature and humidity readings in the data center).

The CPH model is typically used in clinical settings to determine how multivariate factors may impact patient survival. The benefit of the CPH model is that it is able to simultaneously evaluate the effect of several factors on patient survival. Computing devices 310 with likelihoods of failure output by the CPH model that are above a predetermined threshold (e.g., 80% likelihood) may have support tickets generated for them so that data center personnel can examine them and replace parts as needed. For AI and ML, models are built and trained using data in data storage 650.

In some embodiments, initial models for CPH may be built using the open source package known as Therneaux's Survival package in R or Pilon's Lifelines package in Python. Performance of the models may then be tested to confirm that they are satisfactory based on the Concordance index, which is a metric to evaluate the predictions made by an algorithm and can be used for scoring survival models. It is calculated as the proportion of concordant pairs divided by a total number of possible evaluation pairs.

High scoring models may then be augmented by connecting a deep neural network (DNN) to the input of the CPH model. This approach models the censored survival data using the input-output relationship associated with a simple feed-forward neural network as the basis for a non-linear proportional hazards model. In one embodiment this is the Faraggi and Simon method, which uses neural networks for regression. For example, the network may be configured with a single output node along with a one-layer perceptron having an input, hidden nodes, a bias node, and an output. Sigmoid nonlinearity may be used between the input and hidden nodes. Beneficially, these DNN implementations of CPH may outperform traditional CPH and may be more extensible as the neural network architecture can be adjusted or arbitrarily chosen.

In some embodiments, AI module 654 may implement Efron's method for calculating the likelihood, as this method has been shown to be superior to other methods, is faster than exact calculation methods, and tends to yield much closer estimates than other methods. Implementation of Efron's method exists in TensorFlow 2.0, making it more reusable than previous CPH DNN efforts.

Figure 7:
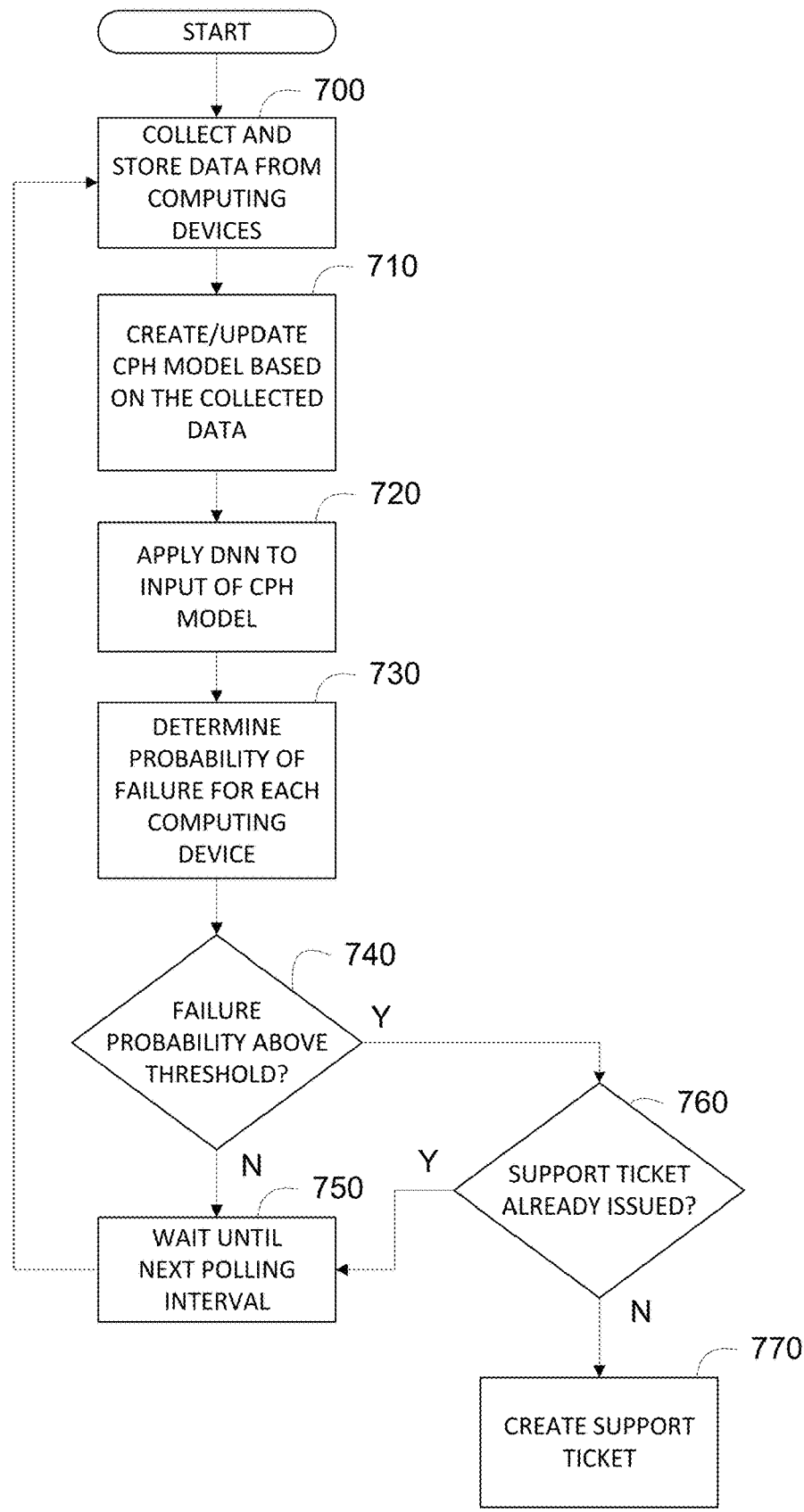
FIG. 7 is a flowchart illustrating another example method of managing computing devices such as miners in a data center.

Turning now to FIG. 7, details of one embodiment of the operation of AI/ML, module 654 is shown. In this embodiment, data from the plurality of computing devices is collected and stored (step 700). A CPH model is created/updated based on the data collected (step 710). A DNN is applied to the input of the CPH module (step 720). A probability of failure for each computing device is determined based on the model (step 730). If the probability of failure is greater than a predetermined threshold (step 740), and a support ticket has not already been generated (step 760), a ticket is generated (step 770). If the failure probability is below the predetermined threshold (step 740), the process waits until the polling interval (step 750) before repeating.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A management device for managing a plurality of computing devices in a data center, wherein the management device comprises:
    a network interface for communicating with the plurality of computing devices,
    a first module that periodically sends health status queries to each of the computing devices via the network interface,
    a second module configured to receive responses to the health status queries and collect and store health status data for each of the computing devices,
    a third module configured to create support tickets, and
    a fourth module configured to:
    (i) create and periodically update a Cox proportional hazards (CPH) model based on the collected health status data;
    (ii) apply a deep neural network (DNN) to an input of the CPH model;
    (iii) determine a probability of failure for each of the plurality of computing devices;
    (iv) compare each determined probability of failure with a predetermined threshold; and
    (v) cause the third module to generate a pre-failure support ticket for each of the plurality of computing devices having determined probabilities of failure that exceed the predetermined threshold.

2. The management device of claim 1, wherein in response to not receiving an acceptable response to a particular health status query within a first predetermined time, the third module is configured to:
    (i) send a first repair instruction,
    (ii) wait at least enough time for the first repair instruction to complete,
    (iii) send a second health status query, and
    (iv) in response to not receiving an acceptable response to the second health status query within a second predetermined time:
    (a) send a second repair instruction,
    (b) wait at least enough time for the second repair instruction to complete,
    (c) send a third health status query, and
    (d) in response to not receiving an acceptable response to the third health status query within a third predetermined time, cause the third module to create a repair ticket.

3. The management device of claim 1, wherein the health status data comprises hash rate.

4. The management device of claim 1, wherein the health status data comprises computing device temperature.

5. The management device of claim 1, wherein the second module is further configured to collect temperature and humidity data for the data center.

6. A method for managing a plurality of computing devices in a data center, the method comprising:
    collecting health status data from each of the plurality of computing devices by periodically transmitting health status queries to each of the plurality of computing devices;
    creating and periodically updating a Cox proportional hazards (CPH) model based on the collected health status data;
    applying a deep neural network (DNN) to an input of the CPH model;
    determining a probability of failure for each of the plurality of computing devices;
    comparing each determined probability of failure with a predetermined threshold; and
    generating a support ticket for each of the plurality of computing devices that have a determined probability of failure that exceed the predetermined threshold.

7. The method of claim 6, wherein the collected health status data comprises telemetry data.

8. The method of claim 7, wherein the collected health status data comprises temperature and humidity readings from within the data center.

9. The method of claim 6, wherein the collected health status data comprises device fan speed.

10. The method of claim 6, wherein the collected health status data comprises device hash rate.

11. The method of claim 6, wherein the collected health status data comprises device temperature.

12. The method of claim 6, wherein the predetermined threshold is 80%.

13. The method of claim 6, further comprising:
    in response to not receiving an acceptable response to a first health status query within a first predetermined time:
    (i) issuing a first repair instruction,
    (ii) waiting at least enough time for the first repair instruction to complete,
    (iii) issuing a second health status query, and
    (iv) in response to not receiving an acceptable response to the second health status query within a second predetermined time:
    (a) issuing a second repair instruction,
    (b) waiting at least enough time for the second repair instruction to complete,
    (c) issuing a third health status query, and
    (d) in response to not receiving an acceptable response to the third health status query within a third predetermined time, issuing a repair ticket.

14. A non-transitory, computer-readable storage medium storing instructions executable by a processor of a computational device, which when executed cause the computational device to:

collect health status data from each of a plurality of computing devices in a data center by periodically transmitting health status queries to each of the computing devices;

create and periodically update a Cox proportional hazards (CPH) model based on the collected health status data;

apply a deep neural network (DNN) to an input of the CPH model;

determine a probability of failure for each of the plurality of computing devices;

compare each determined probability of failure with a predetermined threshold; and generate a predictive support ticket for each of the plurality of computing devices that have a determined probability of failure that exceed the predetermined threshold.

15. The storage medium of claim 14, wherein in response to not receiving an acceptable response to a first health status query within a first predetermined time:

(i) issuing a first repair instruction, (ii) waiting at least enough time for the first repair instruction to complete, (iii) issuing a second health status query, and (iv) in response to not receiving an acceptable response to the second health status query within a second predetermined time:

(a) issuing a second repair instruction, (b) waiting at least enough time for the second repair instruction to complete, (c) issuing a third health status query, and (d) in response to not receiving an acceptable response to the third health status query within a third predetermined time, issuing a repair ticket.

16. The storage medium of claim 15, wherein the first health status query, the second health status query, and the third health status query are queries for a hash rate, wherein the first repair instruction is to restart a mining application, and wherein the second repair instruction is a device restart instruction.

17. The storage medium of claim 14, wherein the health status data comprises device fan speed.

18. The storage medium of claim 14, wherein the health status data comprises device hash rate.

19. The storage medium of claim 14, wherein the health status data comprises device temperature.

20. The storage medium of claim 19, wherein the health status data further comprises temperature and humidity readings from within the data center.

* * * * *